United States Patent

Dunmead et al.

[11] Patent Number: 5,567,662
[45] Date of Patent: Oct. 22, 1996

[54] METHOD OF MAKING METALLIC CARBIDE POWDERS

[75] Inventors: Stephen D. Dunmead, Midland; David D. Mossner, Coleman, both of Mich.

[73] Assignee: The Dow Chemical Company, Midland, Mich.

[21] Appl. No.: 196,928

[22] Filed: Feb. 15, 1994

[51] Int. Cl.$^6$ .................................................. C04B 35/56
[52] U.S. Cl. ................................................ 501/87; 423/440
[58] Field of Search ................................ 501/87, 88, 89; 423/345, 344, 440

[56] References Cited

U.S. PATENT DOCUMENTS

| | | | |
|---|---|---|---|
| 3,277,222 | 10/1966 | Vachet et al. | 264/63 |
| 3,438,729 | 4/1969 | Ohlgren | 23/208 |
| 3,716,627 | 2/1973 | Middelhoek | 423/440 |
| 3,932,594 | 1/1976 | Gortsema | 423/440 |
| 4,008,090 | 2/1977 | Miyake et al. | |
| 4,190,439 | 2/1980 | Gortsema | 75/24 |
| 4,664,899 | 5/1987 | Kimmel et al. | 423/440 |
| 4,752,456 | 6/1988 | Yoda et al. | 423/291 |
| 4,828,584 | 5/1989 | Cutler | 51/307 |
| 4,886,652 | 12/1989 | Krishman et al. | 423/439 |
| 4,891,338 | 1/1990 | Gesing et al. | 501/87 |
| 4,927,791 | 5/1990 | Isozaki et al. | 501/87 |
| 5,047,372 | 9/1991 | Parrish et al. | 501/87 |
| 5,059,562 | 10/1991 | Gentsu | 501/87 |
| 5,061,661 | 10/1991 | Moyle et al. | 501/87 |
| 5,166,103 | 11/1992 | Krstic | 501/87 |

OTHER PUBLICATIONS

Miyake et al., "The Direct Production of WC from $WO_3$...", Funtai oyobi Funmatsu Yakin, vol. 26, No. 3 (Apr. 1979) pp. 90–95.

Miyake et al., "The Carbon Reductions And Carburization of $WO_3$ With Trial Rotary Carburization Furnace", Funtai oyobi Funmatsu Yakin, vol. 26, No. 2 (Mar. 1979) pp. 72–77.

Primary Examiner—Karkarl Group

[57] ABSTRACT

A method of making metallic carbide powders includes heating a non-static solid reactant mixture of a metal oxide and a source of carbon to a first elevated temperature which is sufficient to cause at least partial carburization of the mixture. The heating is performed in a non-reducing atmosphere having a total pressure of at least one atmosphere for a sufficient time to form a partially-carburized mixture. The source of carbon is employed at a level which is less than the stoichiometric amount needed to produce the metallic carbide. The method may further include admixing a sufficient level of a source of carbon to the partially-carburized mixture to form an adjusted mixture having a total carbon content of the stoichiometric amount needed to make the metallic carbide and carburizing the adjusted mixture in a hydrogen-containing atmosphere at a second elevated temperature which is sufficient to cause the adjusted mixture to form the metallic carbide having a particle size of less than 0.2 micrometers in diameter.

17 Claims, No Drawings

METHOD OF MAKING METALLIC CARBIDE POWDERS

BACKGROUND OF THE INVENTION

1. Field of the Invention

The present invention relates generally to methods of making metallic carbide powders and, more particularly, to methods of making metallic carbide powders having a particle size of greater than 0.0 micrometers, but less than 0.2 micrometers (μm).

2. Description of the Related Art

Various metallic carbides, such as tungsten carbide, are useful for making articles which require substantial mechanical strength, such as dies, cutting tools, and drilling tools. One method for making tungsten carbide has been disclosed in the article, "The Direct Production of WC from $WO_3$ by Using Two Rotary Carburizing Furnaces", Journal of Japan Society of Powder and Powder Metallurgy, Volume 26, No. 3, pages 90+, by M. Miyake, et al. The article discloses a method of forming WC by pelletizing and reacting a $WO_3$ and carbon mix in a series of two rotary furnaces. The first furnace operates in nitrogen and allows the reaction to form W, $W_2C$, WC, and C which are then fed directly into a second rotary furnace operating in hydrogen for final carburization. The method is difficult because in order to maintain tight control of the carbon content in the final product, it requires precise control of the $CO/CO_2$ partial pressure ratio.

Another method of making monotungsten carbide (WC) is disclosed in U.S. Pat. No. 5,166,103 to Krstic. The disclosed method entails reacting a mixture of tungsten oxide and carbon powders under vacuum while agitating to enhance the release of carbon monoxide. However, the Krstic method does not lend itself well for large-scale production processes, as it is not desirable to operate large-scale production processes under vacuum.

A third method of making WC powder is disclosed in U.S. Pat. No. 4,664,899 to Kimmel, et al. The disclosed method entails (a) mixing tungsten oxide or ammonium paratungstate with carbon to form a mixture which is substantially reduced in a nonreducing atmosphere in the presence of sufficient carbon to produce a carbon content in the resulting mixture of less than seven percent by weight (wt %) and (b) adding sufficient carbon to the resulting reduced mixture to increase the carbon content to at least the stoichiometric amount needed to form WC prior to carburization of the mixture to monotungsten carbide.

In Kimmel, et al.'s examples, the initial reactant mixture is loaded into boats and stoked through a 1121° C. furnace for 2.5 hours, after which it is necessary to blend the reacted mixture for homogeneity. The final WC products prepared in the Examples had particle sizes, as measured by Fisher Subsieve Size of from 1.00 to 1.38 μm.

In spite of the available methods for making metallic carbides, there remains a need for a non-vacuum, economical process suitable for large-scale production of submicrometer metallic carbides having low free carbon and oxygen contents. It would also be advantageous to have available a method which is capable of making a mixture of at least two types of metallic carbides.

SUMMARY OF THE INVENTION

The present invention is a method of making metallic carbide powders which comprises heating a nonstatic solid reactant mixture of a metal oxide and a source of carbon to a first elevated temperature which is sufficient to cause at least partial carburization of the mixture. The heating is performed in a non-reducing atmosphere having a total pressure of at least one atmosphere for a sufficient time to form a partially-carburized mixture. The source of carbon is employed at a level which results in a total carbon content of less than the stoichiometric amount needed to produce the metallic carbide.

A sufficient level of a source of carbon may be subsequently admixed with the partially-carburized mixture to form an adjusted mixture having a total carbon content of the stoichiometric amount needed to make the metallic carbide, and the adjusted mixture may be carburized in a hydrogen-containing atmosphere at a second elevated temperature which is sufficient to cause carburization of the adjusted mixture to form the metallic carbide which has a particle size of less than 0.2 μm.

One advantage of the present invention is that a method is provided for making extremely fine particle size metallic carbides which (a) does not require an atmosphere under vacuum, (b) is economical, and (c) is suitable for large-scale production of submicrometer metallic carbides having low free carbon and oxygen contents. The method is also capable of making an intimate mixture of at least two types of metallic carbides.

Other features and advantages of the present invention will be readily appreciated as the same becomes better understood after reading the subsequent description.

DESCRIPTION OF THE PREFERRED EMBODIMENT(S)

The method of the present invention generally entails heating a non-static solid reactant mixture of a metal oxide and a source of carbon in a furnace or other heating vessel having a non-reducing atmosphere for a sufficient time to form at least a partially-carburized mixture. Types of metal oxides suitable for the method of the present invention include titanium oxide, zirconium oxide, hafnium oxide, vanadium oxide, niobium oxide, tantalum oxide, chromium oxide, molybdenum oxide, tungsten oxide, and mixtures thereof.

In some instances, it may be economically favorable to employ a combination of metal oxides to achieve a composite of metallic carbides having individual crystals of each type of metallic carbide. For example, a combination of tungsten oxide and molybdenum oxide forms a $WC-Mo_2C$ composite powder consisting essentially of crystals of WC and crystals of $Mo_2C$. A densified part produced from the $WC-Mo_2C$ composite exhibits desirable physical properties, yet is less expensive to make than a part made solely of WC.

The method of the present invention is capable of using oxides which are widely available, such as those that have a particle size of from about 1 to about 20 μm, and still achieves the desired product particle size of greater than 0.0 μm, but less than 0.2 μm. For tungsten trioxide ($WO_3$), particle sizes of from 1 to 20 μm roughly correspond to surface areas of from 0.04 to 0.8 $m^2$/gram.

Sources of carbon suitable for the method of the present invention include any finely divided form of carbon, such as carbon black, lampblack, acetylene black, and other forms of carbon.

The source of carbon is employed at a level which results in a total carbon content of less than the stoichiometric amount needed to produce the desired metallic carbide. For example, if the desired metallic carbide is monotungsten carbide, the total carbon should be less than 6.13 wt % in the partially-carburized mixture. Preferably, the source of carbon is employed in an amount which is about 80 to about 99 wt % of the stoichiometric amount of carbon needed to produce the desired metallic carbide. When calculating the level of the source of carbon needed, it is assumed that all of the oxygen in the solid reactant mixture reacts with carbon and evolves as carbon monoxide. Therefore, the level of the source of carbon needs to take into account the loss of carbon as carbon monoxide.

The mixture of the metal oxide and the source of carbon may be prepared by blending one or more metal oxides with the source of carbon using any suitable blending technique, e.g., by ball milling or in a blender. The mixing is performed until a generally uniform blend is achieved. The mixture may be employed in the present method in powder form, as pelletizing the reactants is not necessary.

Heating of the non-static solid reactant mixture is performed in a non-reducing atmosphere having of pressure of at least one atmosphere. Preferably, the pressure is just slightly above one atmosphere, to decrease the occurrence of air leaking into the furnace.

The non-reducing atmosphere may consist of, e.g., nitrogen and/or argon. The atmosphere is typically a flowing atmosphere to carry away gaseous by-products from the reaction, such as, carbon monoxide, which minimizes the required reaction time. Flowing atmospheres which exchange the atmosphere about 1 to about 100 times per minute, preferably, from about 10 to about 50 times per minute, are advised.

As mentioned, during heating, the solid reactant mixture is non-static, i.e., continuously overturned. The solid reactant mixture may be in a bed which is preferably overturned enough to have essentially no partial pressure, temperature, or composition gradients in the bed. The overturning may be achieved by placing the solid reactant mixture in a container having a longitudinal axis, positioning the container so that the longitudinal axis is at an acute angle relative to horizontal, and rotating the container along its longitudinal axis during heating. Such a container may be placed at, e.g., angles from about 5° to about 45° relative to horizontal and, more preferably, from about 10° to about 35° relative to horizontal.

Heating of the solid reactant mixture may be performed in any suitable furnace, e.g., an induction furnace. The heating is performed to reach a first elevated temperature which is sufficient to cause at least partial carburization of the reactant mixture. The first elevated temperature must be high enough such that the carburization reaction is thermodynamically favorable, i.e., the Gibbs free energy change for the reaction is negative. For the Gibbs free energy change to be negative, the free energy of formation of the reaction products must be less than the free energy of formation of the components of the reactant mixture. The first elevated temperature must also be less than the melting point of any intended reaction product(s). Approximate temperatures at which the free energy of formation of reaction products is less than the free energy of formation of the components of the reactant mixture needed to form the following reaction products are: monotungsten carbide (WC) 677° C.; titanium carbide (TiC) 1282° C.; tantalum carbide (TaC) 1108° C.; vanadium carbide (VC) 659° C.; hafnium carbide (HfC) 1661° C.; niobium carbide (NbC) 955° C.; zirconium carbide (ZrC) 1657° C.; dimolybdenum carbide ($Mo_2C$) 469° C.; and trichromium dicarbide ($Cr_3C_2$) 1110° C.

For making WC, the first elevated temperature is from about 1000° to about 1120° C., which is lower than some temperatures taught in prior art methods. The lower temperatures assist in producing a product having the small desired product particle size and reduced amounts of agglomeration and require less energy than those methods operating at higher temperatures.

The heating of the solid reactant mixture is performed for a sufficient time to form at least a partially-carburized mixture. A partially-carburized mixture contains at least two materials selected from the elemental metal and various forms of the metallic carbide and may or may not contain free carbon. For example, if tungsten oxide is used, the partially-carburized mixture contains tungsten (W), ditungsten carbide ($W_2C$), and WC.

Typically, the heating is performed until the reaction is essentially complete. One method of monitoring when the reaction is complete is by monitoring the partial pressure of the carbon monoxide by-product. When the carbon monoxide level in the atmosphere reaches the level it was prior to the reaction, the reaction is considered complete. Another method of determining when the reaction is complete is by monitoring the oxygen content in the reactant mixture. When the oxygen content in the reactant mixture is less than about 0.75 wt % oxygen, the reaction is considered complete.

Typically, the time required to form the partially-carburized mixture is less than one hour and it is a function of the temperature and the material being made. For example, for making WC, if the reaction is conducted at about 1120° C., the reaction is complete within about 15 minutes. If the WC reaction is conducted at about 1000° C., the reaction is complete within about 35 minutes.

Once the partially-carburized mixture has been formed, it is preferably cooled to room temperature and homogenized, e.g., by ball milling. The partially-carburized mixture is then analyzed for both carbon and oxygen content to determine the amount of carbon needed to form a mixture having the stoichiometric amount of carbon needed to make the desired metallic carbide. Once again, the oxygen level is taken into account, as some of the carbon will be combined with the oxygen and leave the reaction in the form of carbon monoxide.

A carbon-adjusted mixture is then prepared by admixing a sufficient level of a source of carbon to the partially-carburized mixture to form a mixture having a total carbon content of the stoichiometric amount needed to make the metallic carbide. The mixing of the source of carbon into the partially-carburized mixture may be done using any suitable mixing technique, e.g., using a ball mill or blender.

The carbon-adjusted mixture is then carburized in a hydrogen-containing atmosphere at a second elevated temperature which is sufficient to cause carburization of the adjusted mixture. The second elevated temperature must meet the same criteria as the first elevated temperature as discussed hereinabove. The second elevated temperature may be the same as or different than the first elevated temperature. For making tungsten carbide, the second elevated temperature is from about 1200° C. to about 1300° C. Desirably, the carburizing step is also performed in a non-static fashion. However, the non-static mode is not necessary to achieve the small, desired product particle size.

The hydrogen-containing atmosphere may contain from about 4 to 100 mole percent hydrogen with the balance being an inert gas such as argon. Atmospheres having about 4–5 mole percent hydrogen are advised to minimize the use of flammable atmospheres. The atmosphere is typically a flowing atmosphere to carry away gaseous by-products from the reaction, such as, methane. Flowing atmospheres which exchange the atmosphere about 1 to about 100 times per minute, preferably, from about 10 to about 50 times per minute, are preferred.

The carburizing of the carbon-adjusted mixture is performed until the oxygen content in the mixture is essentially nil. Typically, the carburizing takes about one hour.

Using the method of the present invention, metallic carbides are formed which have a particle size of less than 0.2 μm and preferably greater than 0.05 μm. Metallic carbide powders sized less than 0.05 μm are more difficult to handle and process than powders having greater particles sizes.

The present method enables production of metallic carbides having particle sizes less than the particle sizes of the starting metal oxides. For example, the particle size of the metallic carbide produced by the present method is at least 5 times less, sometimes at least 10 times less, and other times at least 100 times less, than the particle size of the starting metal oxide.

The metallic carbide produced by the present method has an oxygen content of less than about 0.5 wt %, more typically, less than about 0.3 wt %, and a free carbon content of less than about 0.1 wt %, more typically, less than about 0.05 wt %.

The metallic carbides formed by the method of the present invention are useful for making densified ceramic bodies. Densified ceramic bodies made using metallic carbides having a particle size of less than 0.2 μm exhibit a greater toughness and Vickers hardness than those made using metallic carbides having greater particle sizes. This benefit is discussed in U.S. patent application Ser. No. 08/056,142, filed Apr. 30, 1993, which application is hereby incorporated by reference. The application discusses the improved properties exhibited by ceramic bodies made using metallic carbides having a particle size of less than 1.1 μm.

The following examples are illustrative only and should not be construed as limiting the invention which is properly delineated in the appended claims.

Synthesis conditions and times will vary when making carbides other than WC or WC-$Mo_2C$ but may be readily determined by those skilled in the art.

EXAMPLES

Example 1

A 1.0 kg mixture of tungsten oxide and carbon was prepared by milling 84.66 parts by weight T-O3 tungsten oxide available from GTE Products Corporation, Stanford, Conn., and 15.34 parts by weight Shawinigan Acetylene Black available from Chevron Chemical Company, San Francisco, Calif., with WC-Co milling media having a diameter of 0.48 cm. The milling was performed in a polyurethane-lined 11.4-liter mill 66 percent-filled with the milling media at a rate of approximately 50 rpm. The mill was operated for 2 hours, then the mill was emptied of its contents, cleaned, refilled with the contents, and the mill was operated for another 2 hours. The powder resulting from the milling operation was passed through a 60-mesh screen to remove the milling media.

The milled mixture of tungsten oxide and carbon was then placed into a 20-centimeter-diameter graphite crucible which was about 23 centimeters in length and was placed in an induction furnace having an inside volume of about 1 liter. The crucible was positioned in the furnace at a 22.5° angle with respect to horizontal. The crucible was rotated at approximately 6 rpm, and the furnace was heated to 1120° C. to cause the reaction to occur between the tungsten oxide and the carbon while flowing about 20 liters/minute argon through the furnace. The atmosphere within the furnace was argon at the onset of the reaction and, during the reaction, the atmosphere was argon with a small partial pressure of carbon monoxide created by the reaction. The temperature of the furnace was first increased about 20°/minute to 1000° C. and then increased about 5°/minute to 1120° C. The extent of the reaction was monitored by analyzing the carbon monoxide generated. As soon as the carbon monoxide level decreased back to the carbon monoxide level at the start of the reaction (baseline level), the crucible was allowed to cool naturally. The reaction was essentially complete in about 15 minutes, measured from the start of the generation of carbon monoxide to the end of the generation of carbon monoxide, forming a partially-carburized mixture of W, $W_2C$ and WC.

The cooled partially-carburized mixture had oxygen and total carbon contents of 0.45 wt % and 5.01 wt %, respectively, and had a particle size of approximately 0.1 to 0.2 μm in diameter.

The partially-carburized mixture was then carburized by admixing therewith 5.01 grams of carbon which was enough carbon to reach the stoichiometric amount needed to form WC. The resulting carbon-adjusted mixture was heated to 1250° C. while rotating in the graphite crucible at 6 rpm. 500 grams of the carbon-adjusted mixture were carburized at a time. The temperature was maintained at 1250° C. for 2 hours in a 5 percent hydrogen—95 percent argon atmosphere. During this carburizing step, essentially all of the W and $W_2C$ was converted to WC. The resulting product was substantially pure WC having a 0.15 wt % oxygen content, a 6.10 wt % total carbon (free and combined carbon) content, and a particle size of approximately 0.1 to 0.2 μm in diameter.

Comparative Example 1

The experiment described in Example 1 was repeated except that the crucible was not rotated. The carbon monoxide level decreased back to the baseline level in approximately 90 minutes.

The cooled partially-carburized mixture had oxygen and total carbon contents of 0.4 wt % and 4.90 wt %, respectively, and had particle size of approximately 0.5 to 0.7 μm in diameter.

The partially-carburized mixture was then carburized according to the method described in Example 1 except that 6.41 grams of carbon were added to form the carbon-adjusted mixture. The resulting product was substantially pure WC having a 6.13 total carbon content and a particle size of approximately 0.5 to 0.7 μm in diameter.

Example 2

The experiment of Example 1 was repeated except that the temperature of the furnace was maintained at 1000° C. In this example, the carbon monoxide level decreased back to the baseline level in approximately 32 minutes.

The cooled partially-carburized mixture had oxygen and total carbon contents of 0.6 wt % and 4.98 wt %, respectively, and had a particle size of approximately 0.1 μm in diameter.

The partially-carburized mixture was then carburized according to the method described in Example 1 except that 5.91 grams of carbon were added to form the carbon-adjusted mixture. The resulting product was substantially pure WC having a 0.1 wt % oxygen content, a 6.14 wt % total carbon content, and a particle size of approximately 0.1 μm in diameter.

Comparative Example 2

The experiment described in Example 2 was repeated except that the crucible was not rotated. The carbon monoxide level decreased back to the baseline level in approximately 150 minutes.

The cooled partially-carburized mixture had oxygen and total carbon contents of 0.75 wt % and 4.85 wt %, respectively, and had a particle size of approximately 0.5 μm in diameter.

The partially-carburized mixture was then carburized according to the method described in Example 1 except that 6.55 grams of carbon were added to form the carbon-adjusted mixture. The resulting product was WC with a trace of $W_2C$ having a 6.08 weight percent total carbon content and a particle size of approximately 0.5 μm in diameter.

Example 3

The experiment described in Example 2 was repeated except that as soon as the carbon monoxide content decreased back to the baseline level, the temperature of the furnace was increased 10° C./minute to 1120° C. The furnace was maintained at 1120° C. for 5 minutes, and then the resulting partially-carburized mixture was allowed to cool naturally.

The cooled partially-carburized mixture had oxygen and total carbon contents of 0.4 wt % and 4.93 wt %, respectively, and had a particle size of approximately 0.1 μm in diameter.

The partially-carburized mixture was then carburized according to the method described in Example 1 except that 6.25 grams of carbon were added to form the carbon-adjusted mixture. The resulting product was substantially pure WC having a 0.1 wt % oxygen content, a 6.15 wt % total carbon content, and a particle size of approximately 0.1 μm in diameter.

Example 4

The experiment described in Example 3 was repeated except that the 1.0 kg mixture contained 15.9 parts by weight carbon, 5.9 parts by weight molybdenum oxide, and 78.2 parts by weight tungsten oxide.

The resulting cooled partially-carburized mixture had oxygen and total carbon contents of 0.58 weight percent and 4.94 wt %, respectively, and had a particle size of approximately 0.1 to 0.2 μm in diameter.

The partially-carburized mixture was then carburized according to the method described in Example 1 except that 6.07 grams of carbon were added to form the carbon-adjusted mixture. The resulting product contained 94 wt % WC and 6 wt % $Mo_2C$ and had a 0.13 wt % oxygen content, a 6.09 wt % total carbon content, and a particle size of approximately 0.1 to 0.2 μm in diameter.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of making metallic carbide powders, comprising heating a non-static solid reactant mixture of a metal oxide and a source of carbon to a first elevated temperature which is sufficient to cause at least partial carburization of the mixture, the heating being performed in a non-reducing atmosphere having a total pressure of at least one atmosphere for a sufficient time to form at least a partially-carburized mixture containing metallic carbide powder, the source of carbon employed at a level which results in a total carbon content equaling at most about 99 weight percent of the stoichiometric amount needed to produce pure metallic carbide from all of the metal oxide in the reactant mixture plus the amount needed to react with the oxygen in the reactant mixture to form carbon monoxide;

admixing a sufficient level of a source of carbon to the partially-carburized mixture to form an adjusted mixture having a total carbon content equaling the stoichiometric amount needed to make pure metallic carbide plus the amount needed to react with the oxygen in the partially-carburized mixture to form carbon monoxide; and carburizing the adjusted mixture in a hydrogen-containing atmosphere at a second elevated temperature which is sufficient to cause carburization of the adjusted mixture to form the metallic carbide having a particle size of less than 0.2 micrometers.

2. The method as set forth in claim 1, further comprising cooling the partially-carburized mixture prior to any further processing steps.

3. The method as set forth in claim 1, wherein the source of carbon is employed in an amount which is about 80 to about 99 weight percent of the stoichiometric amount of carbon needed to make the metallic carbide.

4. The method as set forth in claim 1, wherein the metal oxide is selected from the group consisting of tungsten oxide, molybdenum oxide, and mixtures thereof and the first elevated temperature is from about 1000° C. to about 1120° C.

5. The method as set forth in claim 1, wherein the non-static solid reactant mixture is contained in a container having a longitudinal axis, the container being positioned so that the longitudinal axis is at an acute angle relative to horizontal, and the container is rotating along its longitudinal axis during the heating of the non-static solid reactant mixture.

6. The method as set forth in claim 1, wherein the metal oxide is selected from the group consisting of titanium oxide, zirconium oxide, hafnium oxide, vanadium oxide, niobium oxide, tantalum oxide, chromium oxide, molybdenum oxide, tungsten oxide, and mixtures thereof.

7. The method as set forth in claim 1, wherein the metal oxide is a combination of tungsten oxide and molybdenum oxide and the metallic carbide formed is a $WC-Mo_2C$ composite consisting of crystals of WC and crystals of $Mo_2C$.

8. The method as set forth in claim 1, wherein the solid reactant mixture is in powder form and the metal oxide has a size of from about 1 to about 20 micrometers in diameter.

9. A method of making metallic carbide powders, comprising:

heating a non-static solid reactant mixture of a metal oxide and a source of carbon to a first elevated temperature which is sufficient to cause at least partial carburization of the mixture, the heating being performed in a non-reducing atmosphere having a total pressure of at least one atmosphere for a sufficient time to form a partially-carburized mixture containing metallic carbide powder, the source of carbon employed at a level which is about 80 to about 99 weight percent of the stoichiometric amount of carbon needed to make pure metallic carbide from all of the metal oxide in the reactant mixture plus the amount needed to react with the oxygen in the reactant mixture to form carbon monoxide;

cooling the partially-carburized mixture;

admixing a sufficient level of a source of carbon to the cooled partially-carburized mixture to form an adjusted mixture having a total carbon content equaling the stoichiometric amount needed to make pure metallic carbide plus the amount needed to react with the oxygen in the cooled partially-carburized mixture to form carbon monoxide; and carburizing the adjusted mixture in a hydrogen-containing atmosphere at a second elevated temperature which is sufficient to cause carburization of the adjusted mixture to form the metallic carbide having a particle size of less than 0.2 micrometers.

10. The method as set forth in claim 9, wherein the metal oxide is selected from the group consisting of tungsten oxide, molybdenum oxide, and mixtures thereof and the first elevated temperature is from about 1000° C. to about 1120° C.

11. The method as set forth in claim 9, wherein the non-static solid reactant mixture is contained in a container having a longitudinal axis, the container being positioned so that the longitudinal axis is at an acute angle relative to horizontal, and the container is rotating along its longitudinal axis during the heating of the non-static solid reactant mixture.

12. The method as set forth in claim 9, wherein the metal oxide is selected from the group consisting of titanium oxide, zirconium oxide, hafnium oxide, vanadium oxide, niobium oxide, tantalum oxide, chromium oxide, molybdenum oxide, tungsten oxide, and mixtures thereof.

13. The method as set forth in claim 9, wherein the metal oxide is a combination of tungsten oxide and molybdenum oxide and the metallic carbide formed is a WC-$Mo_2C$ composite consisting of crystals of WC and crystals of $Mo_2C$.

14. The method as set forth in claim 9, wherein the solid reactant mixture is in powder form and the metal oxide has a size of from about 1 to about 20 micrometers in diameter.

15. A method of making metallic carbide powders, comprising:

heating a bed of a non-static solid reactant mixture of a metal oxide selected from the group consisting of tungsten oxide, molybdenum oxide, and mixtures thereof and a source of carbon to a temperature of from about 1000° C. to about 1120° C. in a non-reducing atmosphere having a total pressure of at least one atmosphere for a sufficient time to form a partially-carburized mixture containing metallic carbide powder, wherein the size of the metal oxide is from about 1 to about 20 micrometers in diameter, the source of carbon being employed at a level which is about 80 to about 99 weight percent of the stoichiometric amount of carbon needed to make pure metallic carbide from all of the metal oxide in the reactant mixture plus the amount needed to react with the oxygen in the reactant mixture to form carbon monoxide, the bed of the non-static solid reactant mixture being contained in a container having a longitudinal axis, the container being positioned so that the longitudinal axis is at an acute angle relative to horizontal, and the container is rotating along its longitudinal axis during the heating of the non-static solid reactant mixture;

cooling the partially-carburized mixture;

admixing a sufficient level of a source of carbon to the cooled partially-carburized mixture to form an adjusted mixture having a total carbon content equaling the stoichiometric amount needed to make pure metallic carbide plus the amount needed to react with the oxygen in the cooled partially-carburized mixture to form carbon monoxide; and carburizing the adjusted mixture in a hydrogen-containing atmosphere at a temperature of from about 1200° C. to about 1300° C. to form the metallic carbide having a particle size of less than 0.2 micrometers.

16. The method as set forth in claim 1, wherein the second elevated temperature is from about 1200° to about 1300° C.

17. The method as set forth in claim 9, wherein the second elevated temperature is from about 1200° to about 1300° C.

* * * * *